United States Patent [19]

Meyer

[11] 4,414,643

[45] Nov. 8, 1983

[54] ORDERING SYSTEM FOR PAIRING FEATURE INTERSECTIONS ON A SIMULATED RADAR SWEEPLINE

[75] Inventor: Jerome W. Meyer, San Jose, Calif.

[73] Assignee: The Singer Company, Binghamton, N.Y.

[21] Appl. No.: 263,846

[22] Filed: May 15, 1981

[51] Int. Cl.³ .............................................. G06F 7/00
[52] U.S. Cl. ...................................... 364/900; 434/2
[58] Field of Search ... 364/200 MS File, 900 MS File, 364/456; 434/1, 2

[56] References Cited

U.S. PATENT DOCUMENTS

| 3,685,024 | 8/1972 | O'Connor | 364/900 |
| 4,031,520 | 6/1977 | Rohner | 364/900 |
| 4,110,837 | 8/1978 | Chen | 364/900 |

Primary Examiner—Thomas M. Heckler
Attorney, Agent, or Firm—Douglas M. Clarkson; Jeff Rothenberg

[57] ABSTRACT

The disclosure describes a system for ordering and pairing feature boundary intersections on a sweepline of a simulated digital radar visual display screen in order to arrange a variable length list of data in accordance with a desired order. This ordering and pairing system resolves the correct range order of the intersection pairs for any closed feature shape regardless of boundary convexity, range inaccuracy or possible shape anomalies. The system includes an input data control means (11) having one input connection and a plurality of output connections (14, 16, 18) to store the input data temporarily. There is described two sorting pipelines (12, 13) connected to two of the output connections to receive certain described "key" data in order to sort the data in each respective pipeline in accordance with a desired correct relationship of ranges. A temporary storage means (19) is connected to receive the "non-key" data. Finally, a merge logic circuit (32) receives the outputs from the two pipelines (12, 13) and attaches to each of the "key" data that appropriate "non-key" data.

9 Claims, 4 Drawing Figures

ORDERING SYSTEM FOR PAIRING FEATURE INTERSECTIONS ON A SIMULATED RADAR SWEEPLINE

The Government has rights in this invention pursuant to Contract F33657-77-C-0176 awarded by the Department of the Air Force.

BACKGROUND OF THE INVENTION

The present invention, generally, relates to a new and improved system for the ordering of computed ranges along a simulated radar sweepline between the beginning and the intersections of boundaries of polygonal shapes describing significant ground features. More particularly, the invention permits unambiguous interpretation of a variable length list of intersection ranges obtained by computing the ground range from the simulated radar transmitter to the boundary of each feature intersected by the sweepline, regardless of shape, orientation and convexity.

Electronic data processing systems and equipment have a wide and important function in today's business, research and scientific activities. The electronic equipment and other machines used in such data processing systems usually have a considerable amount of data supplied to them.

Generally, the data processing systems used in business activities, such as maintaining continuous balances in banks and maintaining inventory systems, involve large amounts of data and other information and relatively few simple computational operations. While data processing systems used for research or scientific purposes involve a large number of complex computational operations and a relatively small amount of general information, there are, of course, many exceptions to these generalities.

The data used in such systems is often coded in a manner exemplified by various types of binary codes. For example, binary bits may be used to identify characters such as Arabic numerals, letters of the alphabet or other symbols. These characters may be combined to form records of any convenient length.

Records formed from binary characters may be placed on any of the well-known means of storing, such as punched tape, magnetic tape, punch cards, or magnetic drums, for providing the medium of information in data processing systems. Information supplied to the input which is stored within or appears at the output of these systems is often in a random order with reference to that which is desired.

Therefore, it is common for data processing systems to include means for arranging the records containing information into a desired sequence. Only a portion of a record, known as the "control field", is utilized in determining the precedent of one record over another in a particular sequence.

There are several well-known types of sorting systems used in present day commercial data processing systems. For example, when the record medium is punched cards, a method known as pigeon-hole sorting may be utilized. Such a file of cards is sorted into pockets according to the least significant digit of the control field of each card.

Another known system of sorting information is magnetic tape merging. According to this system, a file of records on magnetic tape is separated into two tape units. The initial records of these two tapes are fed into a storage device.

The system of magnetic tape merging is subject to several disadvantages, however. Most important of these is that a considerable amount of equipment is required in order that the comparison steps take place.

Recently, other uses for sorting have arisen which require higher speed; for example, many real-time processes exist in which sorting of items is required. Among these real-time processes are simulations of physical models to study, duplicate, control and/or otherwise utilize the real world counterparts.

One such use is flight simulation, in which the physical models simulated are those representing the various sensory interfaces between a flight crewman and his immediate environment. The most demanding of these models are those which produce simulated visual imagery, either to duplicate sight directly (computer image generation) or to duplicate imagery produced by non-human sensors, such as infra-red sensors, television or radar.

The features with which the invention is concerned represent significant geographic areas collected into a radar landmass data base describing a simulated environment for use in a digital radar landmass simulator. A digital radar landmass simulator is an air crew training device which presents a digitally-generated radar display simulation for use in conjunction with flight training.

For the purposes of this description, the sweepline on a simulated radar visual display screen is assumed to extend indefinitely and the features are assumed to be of limited extent. Therefore, the list of intersection ranges will always contain an even number, with half representing "entrances" and the other half representing "exits" from any given feature area. This is a readily demonstrated attribute of any straight line intersecting any closed area.

However, the initial list can be in a mixed-up order, depending on the order in which the feature boundary coordinates are given to the intersection processing logic circuit. This depends, further, on the arbitrary choice of absolute feature origin on the sweepline, shape of the feature and orientation relative to the particular sweepline being generated.

It is sufficient for the purpose of this description that each intersection has been detected and the correct range has been computed to a specified accuracy, and by establishing a boundary description convention, each intersection has been identified readily as either entrance or exit. The boundary description convention should stipulate, for example, that each boundary segment is a vector proceeding counterclockwise around the feature area (shown in FIG. 4).

Hence, the inside of the feature would lie to the left of each boundary segment. A segment crossing the sweepline from left to right would result then in an entrance intersection, and a segment crossing from right to left would result in an exit intersection.

The information as to whether a computed intersection with a feature boundary is an entrance or an exit can be added as a single binary bit flag (binary "one" representing "entrance"; binary "zero" representing "exit") to the range value in the intersection list for each feature. Other feature or intersection parameters (such as reflectance code, height, boundary aspect, etc.) also can be added to each feature description, as required.

The purpose of the invention is to reduce this variable length list to a corresponding group of intersection pairs, each pair representing one crossing of the sweepline over part of the feature area. Once this is done, the sweepline radar profile is obtained readily by applying the individual feature descriptions to the corresponding sweepline range segment described by the paired intersections. Also any ambiguity resulting from data base anomalies or range computation inaccuracies is resolved during the pairing or ordering process.

Prior Art

In the past, several suggestions have been made to avoid undue complexity in retrieving and processing the appropriate landmass description for a given radar visual display, particularly as used in a simulator training apparatus. Some such suggestions involved the organization of digital data base information, and perhaps the oldest suggested system involved organization of this information into a grid format.

In this last-mentioned suggestion, the entire data base area is covered with a Cartesian or geodetic coordinate grid. Features to be portrayed are all allocated corresponding grid "patches" and are retrieved by sequential access to those patches which fall along a sweepline path.

A significant disadvantage of the geodetic grid coordinate system is the great volume of data required to describe high resolution grids in which the radar significant parameters of each ground feature must be defined. Consequently, it is more efficient in data storage to describe only the actual features by including their significant parameters and actual boundary locations in a list format.

This not only requires smaller storage space but also allows more precision and fidelity in preserving actual feature shapes. The list format is a natural organization for data bases obtained by semi-automated digitization of maps, charts, aerial photographs and other graphic source materials.

Figure 3:
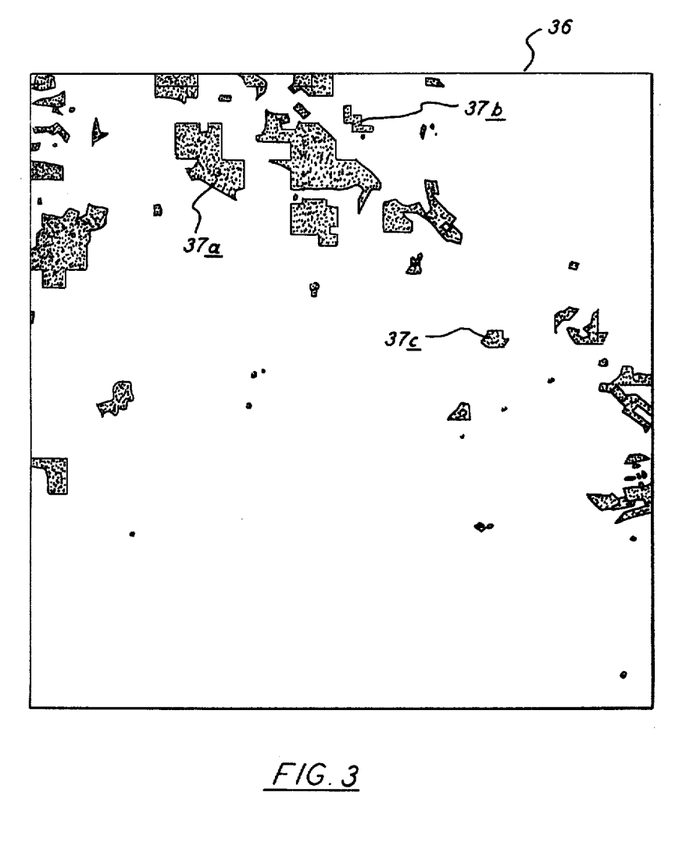
FIG. 3 is a typical radar visual display scene with a typical series of boundary vectors within a feature area to be processed by the data circuit of FIG. 1.

The list format, referred to hereinabove, describes the boundary of each significant terrain or cultural feature by providing an absolute origin (x,y or geodetic) and a series of boundary vectors (coordinate deltas) which circumscribe each feature area. This is illustrated in FIG. 3 of the drawings.

The determination of range (or distance) from an established sweep origin to an intersection between the sweep heading and a particular boundary vector is a straight forward geometric problem. If the data base is in Cartesian coordinates, plane geometric relationships are involved. For a geodetic coordinate system, assuming a spherical earth, the range is interpreted as a great circle distance, and spherical geometry is applied to obtain intersection range from the stored arc coordinates (latitude and longitude) of the feature.

It is common practice to reduce all data base features to convex polygons for use in a real-time radar simulator. By using only convex shapes (e.g., triangles, rectangles, hexagonals, etc.), the problem of determining the contribution of each intersected feature to the sweepline profile is simplified. This simplification is due to the fact that a sweepline can cross a convex feature shape only once; therefore, every convex feature boundary produces two, and only two, intersections with the sweepline (one intersection when the sweepline enters the feature boundary and another when it exits).

However, actual features in the real world assume non-convex shapes, too. So, the creation of a non-convex feature data base requires extra processing work and time, and creates additional boundaries, which add intersections to be processed during the real-time simulation.

Figure 4:
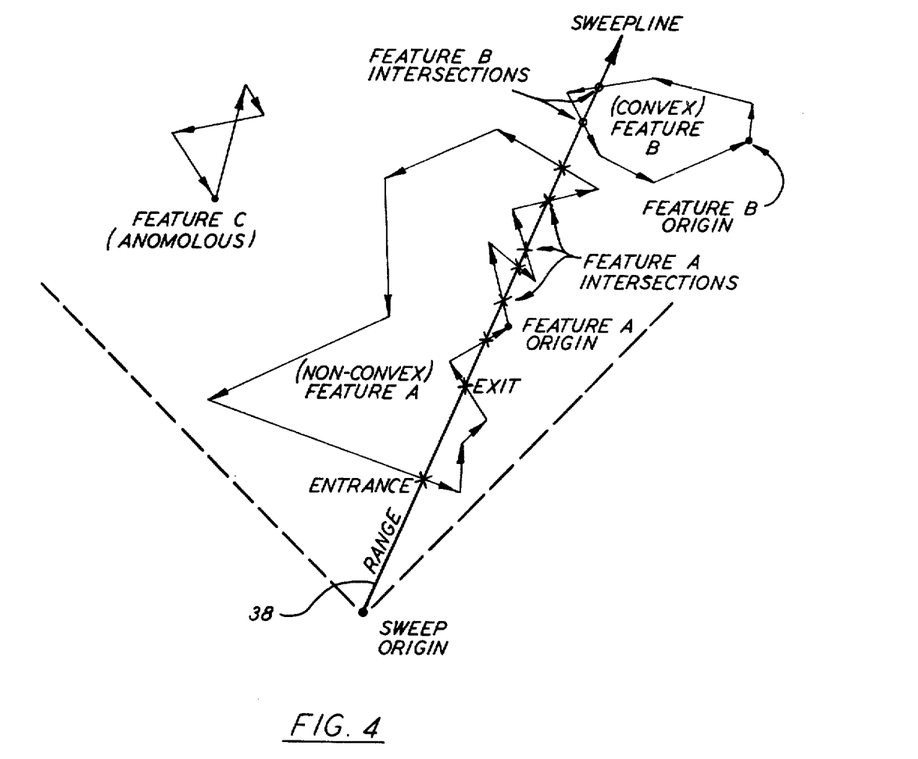
FIG. 4 is a diagrammatic illustration of one sweepline which encounters a variable number of intersections per feature.

It is recognized generally as being desirable to permit real-time management of non-convex feature boundaries because it increases realism. The principal added requirement is that, rather than only two intersections per feature, a variable number of intersections per feature must be accommodated. This is illustrated in FIG. 4 of the drawings. The present invention solves this added requirement by numerical sorting.

Heretofore numerical sorting was done primarily by relatively slow software programs. The limited sorting hardware that has been available was based on a cumbersome comparison technique which sometimes required more comparator elements than words in the input list.

In some instances, the required circuitry increased geometrically as the number of elements in the input list expanded. Further, such prior art hardware and software sorters are not fast enough for the sweep of the electron beam in cathode ray tube displays.

Of the prior art patents that are most representative of devices useful in connection with an ordering system of the present invention, perhaps the following are the most pertinent:

U.S. Pat. Nos. 4,030,077 by Judit K. Florence and 4,031,520 to Michel A. Rohner, both of which are assigned to the Assignee of the present invention.

Some of the shortcomings of the prior art sorting systems are overcome by more recently developed equipment, such as, for example, those described in U.S. Pat. No. 3,311,892 which is assigned also to the Assignee of the present invention.

OBJECTS AND SUMMARY OF THE INVENTION

A system in accordance with the present invention provides for a sorting of computed intersections by entrance or exit and then by range. Following the sorting, the entrance and exit lists are merged, ambiguities arising from range computation in error are resolved and, finally, an unambiguous list of paired intersections is produced.

This final list is suitable for creating a complete sweepline cultural profile of the given feature. When applied to all features encountered by the sweepline, a complete sweepline cultural profile is produced.

Accordingly, it is a principal object of this invention to provide an ordering system to accept a variable length list of data, to include a sorting of the data in accordance with a predetermined characteristic, and a produce a composite list of paired data.

It is also an object of the invention to provide a new and improved data ordering system to process data in a radar visual display equipment in a simulator apparatus.

Another object of the invention is to provide a system to accept a variable length list of at least two feature intersection ranges (entrance and exit) and to produce a composite list of paired intersections with entrance and exit range for each segment of the sweepline which crosses the feature.

Also it is an object of this invention to permit the correct ordering of such lists which may contain anomalies in the order due to inaccuracy in range computation, due to anomalous shape of the intersected feature, or due to other causes.

In accordance with the present invention, an ordering system for ranges on a sweepline of a simulated radar visual display screen to arrange a variable list of data in accordance with a predetermined order involves these circuit components. An input data control circuit has one input connection to receive and to store temporarily all of the input data and has a plurality of output connections.

Each one of the output connections is connected to receive data that has been divided out of all input data in accordance with a predetermined characteristic. Then, a plurality of sorting pipeline circuits is arranged to receive the data that has been divided out in accordance with the predetermined characteristic for sorting and arranging the data in accordance with a pre-selected relationship of ranges.

A suitable memory circuit is connected with at least one of the plurality of output connections from the data control circuit to store temporarily that additional data which is associated with range information. Finally, a merge logic circuit having a plurality of input connections, one for receiving data from each of the sorting pipeline circuits and one for receiving the additional data associated with range information from said temporary storage memory circuit, has one output connection for a composite list of all the input data which is now arranged in accordance with the pre-selected relationship of ranges.

These, other and further objects and advantages of the invention will become obvious from the drawings and the description which appears hereinafter.

BRIEF DESCRIPTION OF THE DRAWINGS

For a fuller understanding of the nature, advantages and objects of the invention, reference may be had to the following detailed description of the presently preferred embodiment, taken in conjunction with the accompanying drawings, in which.

Description Of The Preferred Embodiment

Figure 1:
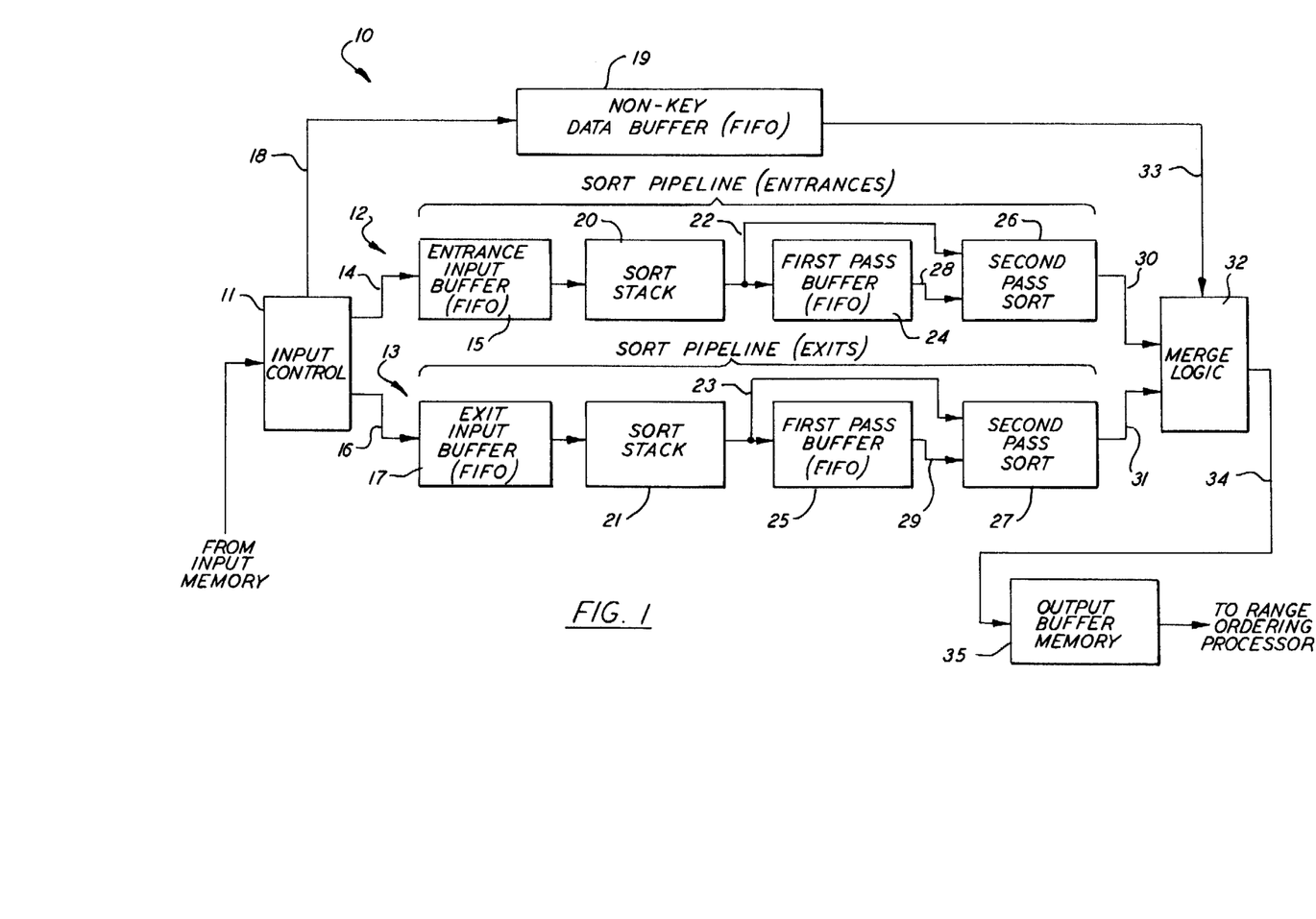
FIG. 1 is a block diagram of an arrangement of component parts in accordance with the invention.

Referring now to FIG. 1 of the drawings, an ordering system constructed and arranged in accordance with the principles of the invention is indicated generally by the reference numeral 10. An input control circuit 11 receives the data sequence from the input memory circuit which stores the entire list of data for a particular feature on a particular sweepline.

However, the order of the feature data at this point is unknown. The data is mixed up and intermingled, because it is stored in the input memory circuit in the order in which it was computed, determined or calculated.

The ordering system 10 of the invention extends the capability substantially for an existing piece of hardware, such as a list processor, by adding thereto an important functional capability. That is, placing the values in an order of increasing range (or distance) is a principal function of the system 10.

There are two principal types or kinds of storage data to be arranged in accordance with the system 10 of the invention, i.e., one: entrance data—that data to show the beginning of a feature encountered by a sweepline of a radar screen, and two: exit data to show a point of exit by the sweepline from a boundary for the feature. The computation, determination or calculation of the list of intersection data, both entrance data and exit data, may be accomplished by any number of ways well-known in the prior art and form no part of the present invention.

The "range" along a sweepline is that distance from the start or origin of the sweepline to the intersection with a boundary of a particular feature to be displayed on the radar screen. Each such range is an information entity, or datum, in the following description.

While there are any number of ways to signify whether a particular datum is entrance or exit information, for the purposes of this illustration, a "flag" is associated with each range datum in order to identify whether the datum is an entrance or an exit datum.

Therefore, the information connected as an input from the memory storage circuit described above is identified in the input control circuit 11 by a "1" bit or a "0" bit associated with each range datum as a "flag", and one of the functions of this input control circuit 11 is to divide such data in accordance with these "1's" and "0's", routing the entrance data into a pipeline indicated generally by the reference numeral 12 and the exit data into a second, identical pipeline, identified generally by the reference numeral 13.

It is an important function of the input control circuit 11 to divide the list of input data into two lists, one containing entrance intersection data representing range, or distance, along a sweepline and the other containing exit intersection data along the same sweepline. The two lists are checked to ensure that they contain an equal number of intersection data.

If the entrance list is one short, an intersection datum is added at zero range. No other exceptional instances can occur provided the sweepline is always ensured to be longer than any feature in the data base.

The flat bit is added to each word as a predetermined characteristic for the purpose of identifying the entrance and the exit data, and as such, each flag bit can be discarded after it has served this purpose.

Figure 2:
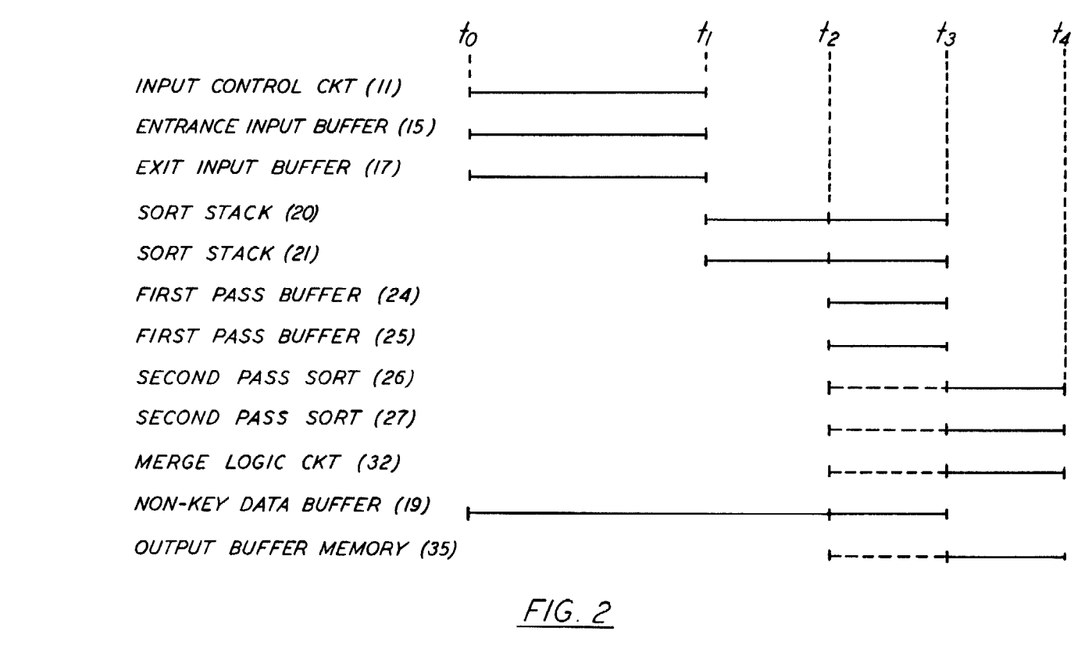
FIG. 2 is a timing diagram of the flow of feature data through the components of the invention.

One such data list is received from the input memory circuit for each feature encountered by each sweepline of the radar visual display in a simulator. The timing of the flow of this list through the subsequent operations is illustrated by FIG. 2.

A connection 14 is one of a plurality of output connections from the input control circuit 11 and serves to connect all of the entrance data into the pipeline 12 where it is stored temporarily in an entrance input buffer circuit 15 pending receipt of all of the entrance data from the input control circuit 11. Similarly, a connection 16 is one of this plurality of output connections from the input control circuit 11 to an exit input buffer circuit 17 which serves to retain all of the exit data until the list is completed. These data constitute "key" information on which subsequent sorting will be done. This process begins at $t_0$ and is completed by the time indicated in FIG. 2 as $t_1$.

A third output connection 18 of the plurality of output connections from the input control circuit 11 connects all of the additional "non-key" data associated with "range" information, such as color, brightness, etc., whatever other attributes a feature should display, to a non-key data buffer circuit 19. This data consists of all data other than entrance or exit data and is identified by preassigned additional data. The non-key data is stored or retained temporarily here in the non-key data buffer until all of the sorting, ordering and pairing of the entrance and exit data is completed at $t_3$ (FIG. 2).

The input control circuit 11 could contain, for example, a simple ENABLE circuit on a REGISTER circuit to direct data into the correct pipeline, either pipeline 12 or pipeline 13. This is essentially a "de-multiplexer" circuit because of its having one input connection and three output connections.

It should be noted particularly that the entrance sort pipeline 12 is identical in arrangement of component parts and hardware with the exit sort pipeline 13. It also performs the function of keeping track of the number of the entrance data.

The input control circuit 11 contains simple counter circuits to determine whether the total number of data is even or odd. This need only be a single bit counter, such as a flip-flop circuit, initialized to a reset state prior to receipt of the list of data.

If toggled for each datum entity received, it will be returned to the reset state for each even datum. Thus, the final state will indicate whether the respective entrance list must be completed as described earlier.

The entrance input buffer circuit 15 is a memory circuit to receive and to store the entrance data temporarily.

Completion of the list would require one final memory load operation in the entrance input buffer 15 with the data input forced to zero value. This is accomplished easily by means of logic circuits well-known to those versed in digital logic circuits and design techniques.

The exit input buffer circuit 17 is identical with that just described, and these two circuits 15 and 17 are "First In-First Out" memory circuits whose components can be Part No. 67401 manufactured by MMI, which is a "First In-First Out" memory chip, or they can be Part No. 9423, manufactured by Fairchild, for a similar function. An important purpose of these two circuits 15 and 17 is to collect all of the data information put in sequentially, before any output is made available.

Assume, for example, 14 values of data in the input control circuit 11. This should result in seven data values in the entrance buffer circuit 15 and seven data values in the exit buffer circuit 17; but all seven must be in each of the buffer circuits before any output is available. Then, the output from the entrance buffer circuit 15 is timed to occur simultaneously with the output from the exit buffer circuit 17.

Now, with all of the key data that was connected first to the input control circuit 11 now divided between the entrance sort pipeline 12 and the exit sort pipeline 13 and the balance in the non-key buffer circuit 19, the data stored temporarily in the entrance buffer circuit 15 and the exit buffer circuit 17 is connected simultaneously into sort stacks 20 and 21, respectively. This would occur beginning at $t_1$ and would continue until $t_3$, while the next feature data is being collected by the same buffer circuits 15 and 17.

The hardware for the sort stacks 20 and 21 is in the form of a simple comparator circuit, such as that described in U.S. Pat No. 4,031,520 to Michel A. Rohner and assigned to the same Assignee as the present invention, in combination with Registers, two input multiplexer circuits on each Register, except the first, making a total of 15 comparator circuits. There would be 15 two-input multiplexer circuits also, and there would be one Register that does not need a multiplexer circuit (the first Register circuit).

The comparator circuits each compare the incoming values of the data with all previous values in the sort stack and would insert a value coming in between the next larger value and the next smaller value. Therefore, both of the lists, i.e., the entrance data list and the exit data list, are sorted in the respective pipelines 12 and 13 by the increasing range values, during the interval between $t_1$ and $t_3$ (FIG. 2).

The shortest range value for the entrance and the exit intersections will be first in the list of respective values. Incidentally, data with equal range values may be ordered arbitrarily relative to each other.

Assume that the sort stack 20 and the sort stack 21 each is a N-entry sort stack, meaning that each sort stack can handle readily N-data values. Then, if the number of data values in each of the sort stacks 20 and 21, respectively, is N or less, no additional sorting will be needed. This would be completed by time $t_2$, in this case, and all subsequent operations would occur one time interval earlier, as indicated by the dashed horizontal lines in FIG. 2.

The sorted data is connected by means of connections 22 and 23, respectively, around first pass buffer circuits 24 and 25, respectively, through second pass sort circuits 26 and 27, respectively, (no output of data appears on connections 28 and 29, respectively) to appear directly on the output connections 30 and 31, respectively.

Assume, however, that the sort stacks 20 and 21 each is capable of sorting and otherwise ordering N-data values, and that the number of data values in each of the sort stacks 20 and 21 is greater than N, for example, 2N. Then the first received list of N-data values is stored in the first pass buffer 24 and 25, respectively, the second N-data values is sorted and goes directly to the second pass sort circuits 26 and 27. This case is illustrated by the solid horizontal lines in FIG. 2 in the interval from $t_2$ to $t_4$.

In the two circuits 26 and 27, the two sorted and ordered lists are compared, i.e., the lists (each of N-data values) appear on the input connections 22 and 28 and on input connections 23 and 29, respectively. Each of the second pass sort circuits 26 and 27, then, provides an output on connections 30 and 31, respectively, which is an ordered and arranged list of the two lists appearing on the respective input connections 22, 28, 23 and 29.

The second pass sort circuits 26 and 27 only compare the first N group of data values stored temporarily in each respective first pass buffer circuit 24 and 25, respectively, with the sorted second N group of data values which are connected to it directly. By this arrangement, the entire group of data values (up to 2N in number) is sorted and arranged using only one N-entry sort stack. This timing is illustrated by the solid horizontal lines from $t_3$ to $t_4$ in FIG. 2.

The second pass sort circuits 26 and 27, respectively, compare the two values on the respective input connections 22 and 28; 23 and 29, respectively, and connects directly to the output connection 30 and 31, respectively, the smaller value first of the remaining group of data values.

Each of these two second pass sort circuits 26 and 27, each contain a comparator and a multiplexer circuit, the multiplexer circuit being switched according to the results of the comparator circuit.

The single merge logic circuit 32 has a plurality of input connections and has a single output connection. The merge logic circuit 32 contains a comparator to detect any entrance datum greater than the exit datum and to cause such pair to be exchanged. It includes two multiplexer circuits, each having two input connections so that if an exchange is to be accomplished, both multiplexer circuits are switched in order to exchange positions of entrance and exit data values in the merge data list.

Also in the merge logic circuit 32, the non-key data values stored temporarily in the buffer circuit 19 are connected over an input connection line 33 to be recombined with the appropriate data value in this merge logic circuit 32. Therefore, a composite list consisting of paired and ordered entrance and exit data values, along with any non-key information, is connected over a line 34 to a temporary storage output buffer circuit 35.

These final steps all occur between intervals $t_2$ and $t_3$ if only one sorting pass was necessary (no more than N range values), or between $t_3$ and $t_4$ if a second pass was needed (more than N but less than 2N range values).

Each entry in the final list will describe unambiguously a section of the intersecting sweepline with a particular boundary feature. As just described, range value is the key data on which the sort and ordering is made. If other data is to be included for each intersection (e.g., an aspect angle calculation between sweepline and intersected edge), it can be included in the input data and passed through the sorting to the output as non-key information attached to the key data.

Referring now to FIG. 3 of the drawings, the outline 36 is intended to represent an outline of a cathode ray tube, such as is used customarily as the visual screen of a radar system. On such a screen 36, there is shown a scene such as illustrated in this view where a few of the boundaries are indicated generally by the numbers 37a, 37b and 37c and are only three of the many cultural features to be outlined with appropriate boundaries.

Each sweepline, therefore, of a standard cathode ray tube image must be provided with data, first to indicate the boundary of each of these features and, second, information to indicate intensity, modulation, etc. associated with each of these features.

In FIG. 4 of the drawings, three features are identified as feature A, feature B and feature C. The boundaries of each of these features A, B and C is different, and a particular sweepline, indicated generally by the numeral 38, is shown traversing the features A and B in order to depict and to illustrate the intersections involved.

As illustrated also in FIG. 4 of the drawings, a given feature may create a large number of crossings for a particular sweepline, and they may be interspersed very randomly in the output list, depending on the order in which the information is found in the data base.

Furthermore, if features may assume arbitrary shapes, the use of finite range computation accuracy results in a finite probability of transposing intersection ranges. This can be visualized from FIG. 4 in which the sweepline may cross arbitrarily close to the convex vertex of a feature.

Another potential problem is illustrated also in FIG. 4; a feature C has assumed anomalous shape due to an error in the source data or some inaccuracy in coordinate computation, for example. The invention as described is constructed to handle such anomalies.

Once the original list is sorted and merged into legitimate intersection pairs, the entire sweepline feature profile is obtained readily. This is done, for example, by writing the accompanying feature description, e.g., reflectance code, aspect value, height value, etc., into a random access memory (RAM) addressed by sweep range.

Each intersection range pair will contribute the necessary information for the interval between entrance and exit of the described feature. Subsequent reading of the RAM in "address" order results in the desired sweepline profile in "range" order. The present invention does not include this function which is available in the prior art.

The invention is applicable to non-convex features of arbitrary (but known) maximum complexity, limited only by the capacity of the sorting hardware and equipment. The principle of the invention is that for any closed feature shape created from boundary deltas and any intersection straight line, an equal number of entrance and exit intersections are created.

Thus, for any entrance intersection, a corresponding exit intersection exists. This relationship is true equally for straight line intersections on the x,y plane as well as for great circle intersections on a geodetic sphere.

The only exceptional instance is when the intersecting line originates within the feature boundary. However, such an instance is detected readily by virtue of the presence of one more exit than entrance intersection in the feature list. The list can be "completed", then, by adding an entrance intersection at zero range.

The possibility that a sweepline may both start and end within the boundaries of a feature is precluded by the pre-condition that all features are smaller in extent than the shortest sweepline is long. This is assured by subdivision of features during the data base generation, if necessary. In practice, this is rarely necessary since typical feature sizes are much smaller than the radar range capability.

If the calculated range to any intersection exceeds the maximum range to be displayed, the value of this range needs only to have been replaced by the predetermined maximum value. Thus, these values will be available to complete the intersection pairing. In practice, it may be desirable to discard any pairs when both values are detected to be maximum values, although this is not necessary to the correct operation of the invention as described herein.

Data that is pertinent to each boundary feature (such as a reflectance code, height, angular disposition etc.) can be separated and passed to the output merge logic circuit 32 independently to avoid passing it through the sort processing.

The actual hardware used by this invention can take several different forms. The sorting hardware can be of several types, of which three are listed:
  (1) Radix sort, (also called "distribution" sort) involving sorting binary values bit-by-bit or by groups of bits. This can be done either most significant or least significant bit first and is a multi-pass operation depending on the number of bits in the key parameter (intersection range in this case).

(2) Direct comparison or "insertion" sort, in which data value is compared to every previous key value and is inserted between the next larger and the next smaller values in a register stack. This can be a one-pass or a multi-pass operation depending on the hardware and the time limitations. These and other sorting systems are described in the following reference: Knuth, Donald E., "The Art of Computer Programming, Volume 3/Sorting and Searching", Addison-Wesley Publishing Co., 1973.

(3) Merge sort, using multiple passes, for $2^n$ entries, the original list is divided into $2^{n-1}$ two-entry lists by comparing entry pairs. The second pass compares pairs of the two-entry lists, creating $2^{n-2}$ four entry lists, etc. The nth and final pass creates one ($2^{n-n}$) list of $2^n$ entries. Using serial operations, only one comparator is needed at each pass, but successive passes can be pipelined for increased speed.

The sorting hardware configuration described hereinabove is selected to provide the high speed required by a complex feature data base without excessive hardware complexity. This configuration is suitable for handling as many as 2000 feature intersections within a typical sweep interval of 500 microseconds. As shown in FIG. 1 of the drawings, the configuration is arranged to handle a maximum list of 2N intersections per feature with flexibility for an arbitrary mix of features with lessor lists.

The initial range sort accomplished by sort stacks 20 and 21 employs 15 comparators to sort a list of up to 16 entries per pass. Two sorters are used (for the two lists) and will require two passes if the total entries exceed 32 (16 per list). If the second pass is needed, a second list of up to 16 entries is produced by the same sort stacks 20 and 21 while the first is stored temporarily in a First In-First Out (FIFO) memory.

When the second list is sorted, the two are supplied to the second pass sort circuits 26 and 27 for the final sort which is completed in one pass and which uses only one additional comparator circuit. Note that for up to 32 total intersections, sorting is complete after only one pass through the initial sort hardware. The results then can be passed unaltered through the second stage (final) sort circuit.

Timing of the operation as illustrated in FIG. 2 of the drawings is somewhat feature-dependent but can keep pace with a continuous flow of input intersection words. The two First In-First Out memory (or buffer) circuits at the input connection, serve to buffer the lists of the entrance and exit intersection data and present the equal length lists simultaneously to the sorting hardware.

Intersections are steered into the appropriate First In-First Out circuit by the entrance and exit flag bit associated with each data value. The First In-First Out circuits are at least 2N words long to permit continuous input in spite of delay which may occur due to a second pass sort.

Such a delay will occur only if the second stage comparison results in accepting the data from the first stage buffer First In-First Out circuit rather than directly from the first stage sorter on a second pass. Since this can occur only on a required second pass and since the data rates are already reduced by half due to the parallel entrance and exit sorting pipeline, the buffering requirements are not critical.

The most important timing consideration is to synchronize the operation of the two parallel entrance and exit hardware pipelines, so that the two lists proceed into the sorting hardware simultaneously and subsequently arrive simultaneously at the merge logic circuit 32. The latter is necessary to assure merging of the corresponding feature intersection pairs. This occurs during the interval between $t_1$ and $t_4$ in the illustration of FIG. 2.

An additional comparison occurs in the merge logic circuit 32 to assure that the entrance intersection range of each pair does not exceed the exit range. If this occurs, the two intersection data are exchanged. This results in unambiguous correction of any feature edges transposed in range due to range calculation error or due to errors in data base compilation. Since there is no substantial delay involved, the second pass sort, merge operation and output buffer storage occur in the same time interval between $t_3$ and $t_4$.

As indicated earlier, the actual mechanization of the sorting can take several forms. For example, the exclusive use of direct insertion sorting, multi-pass merge sorting or Radix sorting are available.

Many digital hardware and computer sorting uses exist similar to the one described hereinabove. In addition to real-time sensor imagery simulations for active scanning systems (i.e., radar, sonar, laser, ultrasonic, etc.), non-real-time computer algorithms for image generation can benefit from the system described hereinabove.

It is potentially applicable also to passive sensor system simulation, including television, infra-red and visual simulations. The description of intersections distributed in "range" along a radar sweepline is analogous to intersections distributed along a television raster scanline and could be applied, therefore, for ordering objects along the scanline.

Although the invention has been described using various logic, memory, buffer and control circuits, and other specifically described components, it may be practiced also by using the logic elements in a digital computer along with proper programs. The respective sorting steps described hereinabove can be accomplished also in a suitable computer, as may the other functions, if properly programmed. Any number of possible combinations of computer logic and hardware are possible without deviating from the true spirit and scope of the present invention which is intended to be defined by the claims appended hereto.

I claim:

1. An ordering and pairing system for pairing feature intersections on a sweepline of a simulated radar visual display screen, regardless of shape, orientation and convexity, to arrange a variable length list of data in accordance with a desired correct order, comprising:

input data control circuit means having one input connection means to receive and to store temporarily all of said input data, and having three output connection means;

one of said three output connection means being connected to receive data that has been divided out of all said input data in accordance with a first predetermined characteristic to represent "non-key" data;

two sorting pipeline circuit means to receive "key" data that has been divided out in accordance with a second predetermined characteristic for sorting and arranging the "key" data in each of said two sorting pipeline circuit means in accordance with a desired correct relationship of ranges;

circuit means connected with one of said three output connection means from said data control circuit means to store temporarily that data divided out of all said input data which is associated with range information but which represents "non-key" data; and merge logic circuit means having three input connections means, one for receiving "key" data from each of said two sorting pipeline circuit means and one for receiving "non-key" data associated with range data from said temporary storage circuit means, and having one output connection means for all of said input data which is now arranged and paired in accordance with said desired correct relationship of ranges.

2. An ordering and pairing system as set forth in claim 1 wherein said second predetermined characteristic is in the form of an additional bit of information associated with said input data as an identification flag.

3. An ordering and pairing system as claimed in claim 2, wherein said identification flag serves to identify boundary entrance range key data and boundary exit range key data.

4. An ordering and pairing system as claimed in claim 1 wherein said two sorting pipeline circuit means are connected to separate and distinct ones of said three output connections means from said control circuit means.

5. An ordering and pairing system as claimed in claim 4 wherein each of said two sorting pipeline circuit means includes data storage means to receive and to store temporarily said data that has been divided out of all said input data in said control circuit means.

6. An ordering and pairing system as claimed in claim 5 including sorting circuit means connected in each respective pipeline circuit means to receive the data stored temporarily in each respective data storage means to perform said range key sorting function.

7. An ordering and pairing system as claimed in claim 6 wherein said sorting circuit means is adapted to perform said sorting function on items of data in each respective pipeline, buffer data storage means connected in each respective pipeline circuit means to receive a first N items of data sorted by each respective sorting circuit means, and bypass connection means around said buffer storage means.

8. An ordering and pairing system as claimed in claim 7 including a second pass sorting circuit means connected in each of said two pipeline circuit means with two input terminals, each of said second pass sorting circuit means is adapted to perform said sorting functions on 2N items of data in each respective pipeline, one of said two input terminals be connected to the output of said buffer data storage means, and the other one of said two input terminals being connected to receive a second N item, where the total number of such items of data is limited to not more than 2N.

9. An ordering and pairing system as claimed in claim 8 including means to connect the output of each of the two respective second pass sorting circuit means to a different one of said two input connection means on said merge logic circuit means, wherein said merge logic circuit means is adapted to accept and correctly pair said entrance range and exit range data, and output data storage means connected to the output terminal of said merge logic circuit means to store temporarily the output data from said merge logic circuit means.

* * * * *